(12) United States Patent
Tan et al.

(10) Patent No.: US 6,408,364 B1
(45) Date of Patent: Jun. 18, 2002

(54) APPARATUS AND METHOD FOR IMPLEMENTING A LEAST RECENTLY USED CACHE REPLACEMENT ALGORITHM

(75) Inventors: Teik-Chang Tan; Leonel Lozano; Benjamin T. Sander, all of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/528,041

(22) Filed: Mar. 17, 2000

(51) Int. Cl.$^7$ .............................................. G06F 12/00
(52) U.S. Cl. ....................... 711/136; 711/128; 711/133; 711/135
(58) Field of Search ............................... 711/136, 128, 711/133, 146, 134, 135

(56) References Cited

U.S. PATENT DOCUMENTS

| | | | | |
|---|---|---|---|---|
| 5,210,845 A | * | 5/1993 | Crawford | 395/425 |
| 5,367,659 A | * | 11/1994 | Iyengar | 395/425 |
| 5,493,667 A | * | 2/1996 | Huck | 395/452 |
| 5,530,833 A | * | 6/1996 | Iyengar | 395/455 |
| 5,717,916 A | * | 2/1998 | Verma | 395/607 |
| 5,809,528 A | * | 9/1998 | Miller | 711/136 |
| 6,138,206 A | * | 10/2000 | Fisher | 711/118 |

* cited by examiner

Primary Examiner—Do Hyun Yoo
Assistant Examiner—Kimberly N McLean
(74) Attorney, Agent, or Firm—Zagorin, O'Brien & Graham, LLP

(57) ABSTRACT

A least recently used (LRU) cache replacement algorithm is implemented with a set of N pointer registers that point to respective ways of an N-way set of memory blocks. One of the pointer registers is an LRU pointer, pointing to a least recently used way and another of the pointer registers is a most recently used (MRU) pointer, pointing to a most recently used way. For a cache fill operation in which a new memory block is written to one of the N ways, the new memory block is written into the way ($way_n$), pointed to by the LRU pointer. All the pointers except the MRU pointer are promoted to point to a way pointed to by respective newer neighboring pointers, the newer neighboring pointers being neighbors towards the MRU pointer. The MRU pointer is updated to point to the $way_n$ in which the new memory block was written. For a cache hit in which one of the memory blocks in the set, $way_m$, is accessed for a write or read operation, all the pointers $way_m$ and newer, except for the MRU pointer, are promoted to point to a way pointed to by a newer neighboring pointer. The MRU pointer is changed to point to $way_m$. For an invalidate operation in which one of the ways, $way_k$ is invalidated, all the pointers pointing to $way_k$ and older are demoted, except for the LRU pointer. The LRU pointer is pointed to the invalidated way.

26 Claims, 6 Drawing Sheets

|  | WAY 0 | WAY 1 | WAY 2 | WAY 3 | WAY 4 | WAY 5 | WAY 6 | WAY 7 |
|---|---|---|---|---|---|---|---|---|
| INITIAL | P0 | P1 | P2 | P3 | P4 | P5 | P6 | P7 |
| CACHE LINE FILL | P7 | P0 | P1 | P2 | P3 | P4 | P5 | P6 |

FIG. 1A

|  | WAY 0 | WAY 1 | WAY 2 | WAY 3 | WAY 4 | WAY 5 | WAY 6 | WAY 7 |
|---|---|---|---|---|---|---|---|---|
| INITIAL | P0 | P1 | P2 | P3 | P4 | P5 | P6 | P7 |
| WAY 3 INVALIDATED | P1 | P2 | P3 | P0 | P4 | P5 | P6 | P7 |

FIG. 1B

|  | WAY 0 | WAY 1 | WAY 2 | WAY 3 | WAY 4 | WAY 5 | WAY 6 | WAY 7 |
|---|---|---|---|---|---|---|---|---|
| INITIAL | P0 | P1 | P2 | P3 | P4 | P5 | P6 | P7 |
| HIT ON WAY 3 | P0 | P1 | P2 | P7 | P3 | P4 | P5 | P6 |

FIG. 1C

APPARATUS AND METHOD FOR IMPLEMENTING A LEAST RECENTLY USED CACHE REPLACEMENT ALGORITHM

BACKGROUND OF THE INVENTION

1. Field of the Invention

This invention relates to management of cache memories and more particularly to efficient implementation of a least recently used (LRU) replacement algorithm for cache memories.

2. Description of the Related Art

Cache memories provide local copies of portions of system memory in order to enhance processor performance. Data and/or instructions being used by the processor are accessed more quickly when they are in a cache than if they are in main system memory. Typical computer systems have multiple level of caches. The L1 cache is generally the smallest cache and located closest to the processor (typically on the same chip as the processor). The L2 cache is larger than the L1 cache but still significantly smaller than system memory.

Caches provide better performance because software typically operates with locality of reference, meaning that there is a tendency to access a relatively small or local area of memory. If such a local area is brought into the cache memory and the processor can run a program having that property, the program can run by accessing just that cache memory and thus run more efficiently. At some point however, a program operating on the processor will reference a memory location that is not in the cache and the system has to retrieve that memory location. In that way, new data is written into the cache memory. In addition, other functions in the system, such as an I/O device or another processor in a multi-processor system may also be utilizing system memory and may cause locations in the cache to become invalid.

There are different ways to map the system memory into the cache. One common approach utilizes an N-Way set associative cache, in which the cache is segmented into sets where each set contains N cache lines, where N is typically, 2, 4, 8, etc. A cache line is a sequential group of bytes, e.g. 32 or 64. Transactions for cache memories are typically in cache lines rather than in single bytes for efficiency purposes. Different blocks of main memory are assigned to one of the sets of cache lines and thus can be cached in any one of those N locations within that set. Thus, within each set the cache is associative. More memory addresses are assigned to that set than in a direct mapped cache where each address maps to only one cache line.

One important aspect of cache management is what data to include in the cache and when to update it. It has been shown in many performance tests that the least-recently used (LRU) cache replacement algorithm provides better average performance than other algorithms, such as random replacement. In the least recently used approach, the cache line that is oldest in the set is replaced when a new cache line is loaded into the set on the assumption there is a higher likelihood that more recently used cache lines are more likely to be used again rather than older cache lines based on the locality of reference in programs. In order to determine the least recently used (LRU) cache line in an N-way set associate cache, conventional approaches require a significant amount of complex hardware including counters and N-way multiplexers to implement the LRU algorithm. Additionally, status bits are required for each cache entry to track the usage of each entry. When a new entry is made in the set, the status bits need to be scanned to determine which of the cache lines is the least recently used or invalid to determine the appropriate cache line entry to evict to make room for the new entry.

It would be desirable to have an LRU replacement implementation that is less costly than the conventional approach and is logically simple. Specifically, it would be desirable to have an LRU circuit that is faster because it has fewer gates, no counters or N-way multiplexers, and can scale up to support bigger ways (i.e., where N is bigger) without a significant impact on circuit complexity. Further, it would be desirable to be able to store a new cache line in the set without the need for scanning to select an invalid entry over a valid entry for replacement.

SUMMARY OF THE INVENTION

Accordingly, the invention implements a least recently used (LRU) cache replacement algorithm utilizing pointers. In one embodiment the invention provides a method for implementing a least recently used (LRU) cache replacement that maintains a set of N pointer registers that point to respective ways of an N-way set of memory blocks. One of the pointer registers is an LRU pointer, pointing to a least recently used way and another of the pointer registers is a most recently used (MRU) pointer, pointing to a most recently used way. For a cache fill operation in which a new memory block is written into one of the N ways, the new memory block is written into the way (way$_n$), pointed to by the LRU pointer. All the pointers except the MRU pointer are promoted to point to a way pointed to by respective newer neighboring pointers, the newer neighboring pointers being neighbors towards the MRU pointer. The MRU pointer is updated to point to way$_n$, in which the new memory block was written.

The method may further include, for a cache hit in which one of the memory blocks in the set, way$_m$, is accessed for a write or read operation, promoting the pointers way$_m$ and newer, except for the MRU pointer, to point to a way pointed to by a newer nearest neighboring pointer and pointing the MRU pointer to way$_m$.

The method may further include, for an invalidate operation in which one of the ways, way$_k$ is invalidated, demoting all pointers from the pointer pointing to way$_k$ and older but not the LRU pointer and pointing the LRU pointer to the invalidated way.

In another embodiment, the invention provides an integrated circuit having an LRU cache control circuit incorporated therein for one set of N cache lines in an N-way set associative cache. The cache control circuit includes N registers, each register being a way pointer and containing a way pointer value pointing to a respective one of the N cache lines or ways. A predetermined one of the N registers is an LRU way pointer, pointing to a least recently used way, another predetermined one of the N registers is an MRU pointer pointing to the most recently used cache line in the set and the remaining registers are intermediate way pointers pointing to intermediate ways, each of the intermediate way pointers pointing to successively more recently used ways (assuming all the ways are valid), as the intermediate pointers go from the LRU pointer towards the MRU pointer. The cache control circuit also includes a plurality of selector circuits coupled to provide a next pointer value for each of the registers. Each selector circuit for the intermediate way pointers selects either a newer neighbor, an older neighbor or an initial value as the next intermediate pointer value. An MRU selector circuit for the MRU pointer selects either an older neighbor, an initial value for the MRU pointer, a current way hit value or a value of the LRU pointer, as a next MRU pointer value. An LRU selector circuit for the LRU pointer register selects either a newer nearest neighbor, an initial value, or the current way hit for a current operation as a next LRU pointer value.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

FIG. 1A illustrates the operation of the pointer scheme of the present invention for a cache line fill.

FIG. 1B illustrates the operation of the pointer scheme of the present invention for a way being invalidated.

FIG. 1C illustrates the operation of the pointer scheme of the present invention for a hit on one of the ways in the set.

DESCRIPTION OF THE PREFERRED EMBODIMENT(S)

Figure 2A:
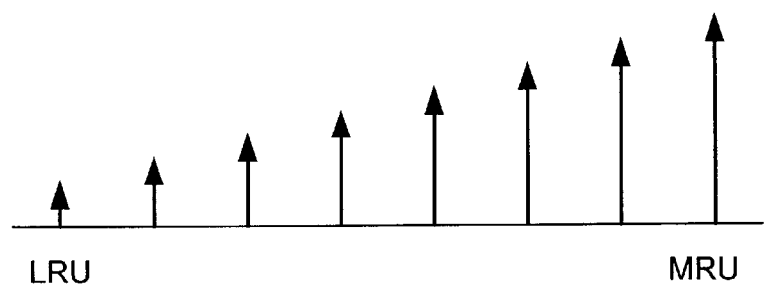
FIGS. 2A–2C illustrate possible organizations of the pointers according to the present invention.

The present invention employs a pointer scheme where each block in a cache memory has an M-bit pointer where M=log(base 2)N. N is the associativity of the cache. Assume, for example a 256 Kbyte cache, which is 8-way (N=8) set associative and has a block size of 64 bytes that is organized in 512 rows of 512 bytes each. Each row has eight 64 byte blocks. That is, each row is a set with eight ways. Each way being a cache line or block of 64 bytes. Thus, for this example, each row or set has eight pointers of 3 bits each (M=3), which point to respective ones of the eight ways. For the present example assume the pointers are labeled P0, P1, P2, P3, P4, P5, P6 and P7. Assume that P0 points to the LRU cache line and that P7 points to the most recently used (MRU) cache line.

Referring to FIG. 1A, on power up, P0–P7 contain unknown values. A bit indicating whether an entry is valid in the cache will be cleared by reset. When a row is being accessed, all eight pointers in that row will be initialized to a predetermined pattern if it is detected that all eight ways in that row are invalid. In one embodiment, the predetermined pattern is the initial pattern shown in the first row of pointers in FIG. 1, in which pointers P0–P7 point respectively to way0–way7. P0 points to the least recently used (LRU) way in that row and P7 points to the most recent used (MRU) way in that row. The fact that a pointer points to a way does not indicate that a particular way is valid.

Suppose after initialization, that a cache line fill is performed. As shown in FIG. 1A, the new cache line is written into the way pointed to by P0. Since that cache line (or way) is now the most recently used, the MRU pointer P7 is changed to point to way0. All the other way pointers are promoted. That is, each way pointer assumes the value of the next newer way pointer. Therefore, P0 now takes the way pointer value previously held in P1, P2 ←P3, P3 ←P4, P4 ←P5, P5 ←P6, and P6 points to the way previously pointed to by P7. As described, the cache line fill takes place without the necessity for scanning to select an invalid entry over a valid entry for replacement.

Note that it is not possible for P0 to be pointing to a way that is valid if any of the other ways in that row are invalid. However, if the way pointed to by P0 is valid, all ways in the row are valid. Therefore, when a way needs to be ejected for a new line fill, the way pointed to by P0 is always selected for ejection. While P0 may not be valid, it is guaranteed that it will either have the oldest valid data or no valid data.

Assume now that one of the ways in the set, e.g., way3 is invalidated by a probe, for example. As shown in FIG. 1B, assuming again an initial state as shown by the top row of pointer P0–P7, if way3 is invalidated, P0, which should always point to the oldest way, is changed to point to way3. All the way pointers P3 or older (except P0) are demoted such that P3 takes on the value in P2, P2←P1 and P1 takes on the value previously in P0. The pointers newer than P3, i.e., P4–P7 remain unchanged. Thus, the pointers end up as shown in the second row of row pointers in FIG. 1B.

A third case is illustrated in FIG. 1C in which a hit occurs on a way pointed to by one of the row pointers. Assume that the hit occurs on way3. The hit may be caused by a read or write access to one of the valid ways in the set. The hit on way3 means that way3 has now become the most recently used way. Accordingly, P7 is changed to point to way3. All the ways that are P3 or newer (P3–P6) are promoted so that, P3 ←P4, P4 ←P5, P5 ←P6, and P6 points to the way previously pointed to by P7. Pointers P0–P2 remain unchanged.

Note that P0 has been designated the "oldest" pointer, the LRU pointer, and P7 has been designated the "newest" pointer, the MRU pointer. It is also conceivable that P7 be the oldest pointer and P0 be the newest. Various initialization patterns are shown in FIGS. 2A–2C.

Figure 2B:
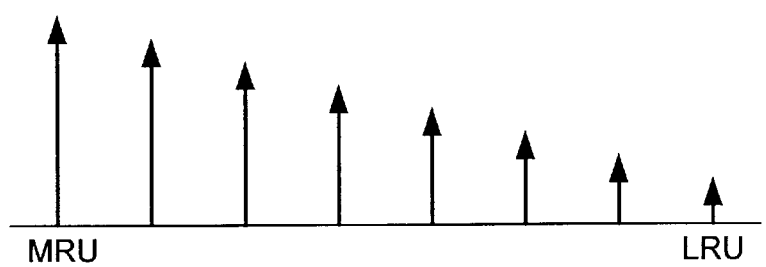
Figure 2C:
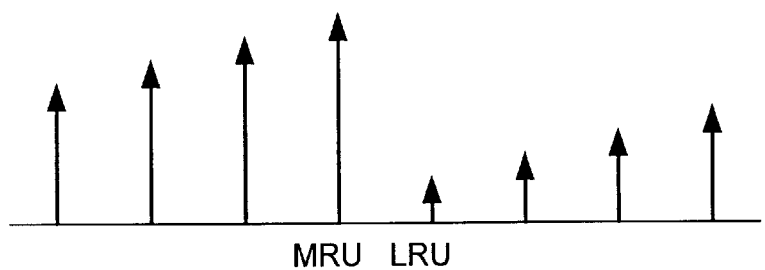

FIG. 2A represents the scenario illustrated in FIGS. 1A through 1C where the oldest pointer, the LRU pointer, represented by the shortest pointer in FIG. 2A, is on the left and the MRU pointer, the tallest pointer is on the right, and the intermediate pointers grow increasingly new (tall) from left to right. FIG. 2B represents a scenario in which the oldest pointer, the LRU pointer, is on the right and the MRU pointer, the tallest pointer, is on the left. The intermediate pointers grow increasing new (taller) from right to left. FIG. 2C represent the scenario in which the MRU and LRU pointers are adjacent. In that case, when demoting or promoting intermediate pointers, the set of pointers are considered to wrap around in the manner that a circular buffer wraps around. The intermediate pointers still remain monotonic as they go from oldest to newest (LRU to MRU) from left to right. The respective positioning of the MRU and LRU pointers affect the direction of shift for promotion and demotion and generation of other control signals as described further herein.

Figure 3:
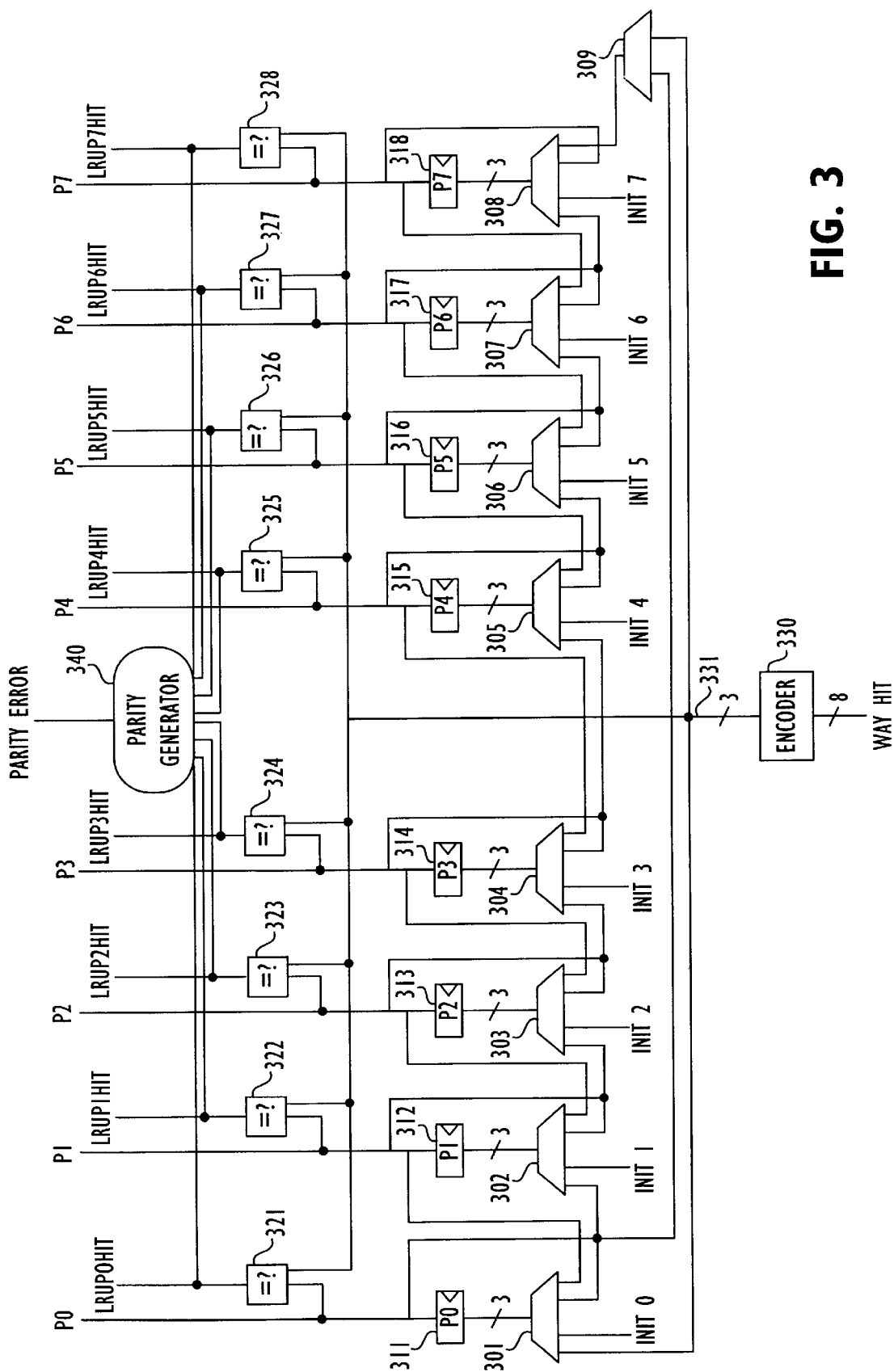
FIG. 3 illustrates hardware for one embodiment of the present invention.

Referring to FIG. 3, one embodiment of the present invention is illustrated. The LRU implementation for an 8-way set associative cache includes multiplexers 301–308, way pointer registers 311–318 and comparators 321–328. The eight way hit signals, received from other cache control logic, are encoded into a three bit value by encoder 330. The encoded value is then passed to the eight equality comparators 321–328, which compare the current way hit to the respective pointer values to determine which of the way pointers points to the way that is hit. The outputs of the comparators are used to control the inputs to the individual multiplexers 301–308 in accordance with the operation of the LRU implementation illustrated in FIGS. 1A–1C and as further described herein.

Assume that register 311 is the LRU pointer P0 in FIGS. 1A–1C and register 318 is the MRU pointer P7. The pointers are initialized when the pointers are all invalid, which may occur on power on reset, when all the ways in the set are marked invalid, or when a parity error is detected. The pointers are set up to their initial values when a first access to the row occurs and the pointers are all invalid. For initialization, multiplexers 301–308 select the default initialization input INIT for their respective pointer registers. In one embodiment, as illustrated in FIG. 1A, P0–P7 are respectively initialized to way0–way7. Thus, P0 is initialized to '000', P1 to '001', P2 to '010' and so on.

Each of the pointer registers always contain unique values. If there is a hit on any of the ways, exactly one comparator should detect the hit. That property can be used to detect any single bit parity error in the LRU bits, thus eliminating the need to protect the LRU bits with extra parity bits. By passing the outputs of the 8 comparators to an exclusive-OR network, parity generator 340, an odd parity result will be generated for every hit. If even parity is obtained, then a parity error may exist within the LRU bits. That is useful for detecting a single bit parity error. When parity errors are detected, the LRU pointers may be identified as invalid and reset to their predetermined initial values.

Note that no counters are utilized in the circuit illustrated in FIG. 3. The only multiplexers are the small four to one multiplexers used to select the new pointer values. No N-way wide multiplexers are required. The multiplexers will not increase in size when more associativity is utilized in the cache. For example, for 16 way associativity, the multiplexers still remain only 4–1 multiplexers with four inputs: an initialization value, a current value, a left neighbor and a right neighbor. Note that the current value may be provided by inhibiting loading the pointer register rather than providing the current value through a multiplexer. Note also that the MRU pointer and the LRU pointer receive somewhat different inputs from the intermediate pointers (P1–P6) and from each other, as explained further herein.

The example described in FIG. 1A will now be explained with relation to FIG. 3. Assume the pointers are initialized as shown in FIG. 1A and a cache line fill is the current operation. The cache line fill occurs at the way pointed to by P0 (register 311), which is guaranteed to be either the oldest way or invalid. That way becomes the most recently used way as result of the fill operation and thus pointer P7 (register 318) is loaded with the P0 value in register 311 through multiplexers 309 and 308. All the other pointer registers P0–P6 are promoted. Thus, P0 register 311 receives the way pointer value in P1 pointer register value 312 through multiplexer 301. The same pattern is repeated for each of the pointer registers P1–P6 which receive the value from their nearest newer neighbor.

The example described in FIG. 1B will now be explained with relation to FIG. 3. Assume the pointers are initialized as shown in FIG. 1B and way3 is invalidated. Encoder 330 encodes way3 ('011') which causes comparator 324 to indicate a P3 hit. All the other comparators, assuming no errors, will indicate no other way pointer hits. The way hit encoder value ('011') is provided through multiplexer 301 to the LRU pointer P0 register 311. Because the invalidated way is "older", none of the way pointers P4–P7 are affected and thus the multiplexers select the "keeper" value such that the way pointer registers are reloaded with the same value. All the registers P3 and older are demoted (except for P0) and thus receive the pointer value from their nearest neighbor that is older. Thus, multiplexer 304 selects the output of P2 register 313 as its input, multiplexer 303 selects the output of P1 register 312 as its input and multiplexer 302 selects the output of P0 register 311 as its input.

The example described in FIG. 1C will now be explained with relation to FIG. 3. Assume there is a hit on way3 for a read or write operation. Encoder 330 encodes way3 ('011') which causes comparator 324 to indicate a P3 hit. All the other comparators, assuming no errors, indicate no other way pointer hits. The way hit encoder value ('011') is provided through multiplexers 309 and 308 to the P7 pointer register 328. Pointer registers P3 and newer are promoted. None of the way pointers that are older than P3 are affected. That is, the multiplexer selects for pointers P0–P2 select the "keeper" value such that the way pointer registers are reloaded with their current value. Pointer registers P3 and newer are promoted (except for P7) and thus receive the pointer value from their nearest neighbor that is newer. Thus, multiplexer 304 selects the output of P4 register 315 as its input, multiplexer 305 selects the output of P5 register 316 as its input, multiplexer 306 selects the output of P6 register 317 as its input and multiplexer 307 selects the output of the P7 register 318 as its input.

As can be seen from the preceding, the multiplexer control logic makes multiplexer select decisions based on the kind of access to the N-way set that is occurring. For instance, the access may be a cache line fill in which a new cache line is being written to a previously invalid way (or a currently valid way is being evicted). The access may be a way hit in which the cache line hit is being read or written. Further, a cache line in the set may be invalidated by a probe operation, indicating that another process in the system is updating that location in another memory.

Details of the invalidating and updating cache lines may vary according to the sort of cache that is utilizing the LRU algorithm described herein. For example, the LRU algorithm may be implemented for an L2 cache. In such circumstances, when a miss in the L1 cache results in a hit in L2, the L1 cache receives the L2 cache line and the L2 cache line may then be invalidated. In such circumstances, the LRU pointer would then be updated to point to the invalidated cache line. Other policies may be implemented, according to performance criterion of the system and the type of cache being utilized.

In addition, policies may vary according to the type of data being accessed. For example, assume there is a page table cached in an L2 cache. A hit on a page table entry in the L2 cache may not invalidate the entry in L2 as might happen for example, if there was a hit on an L2 data and/or instruction cache line after an L1 miss, which is then moved into the L1 cache as described above. Further, whether the pointer to the cache line containing the page table hit is upgraded or left alone will depend on particular system policies and performance criterion.

Figure 4:
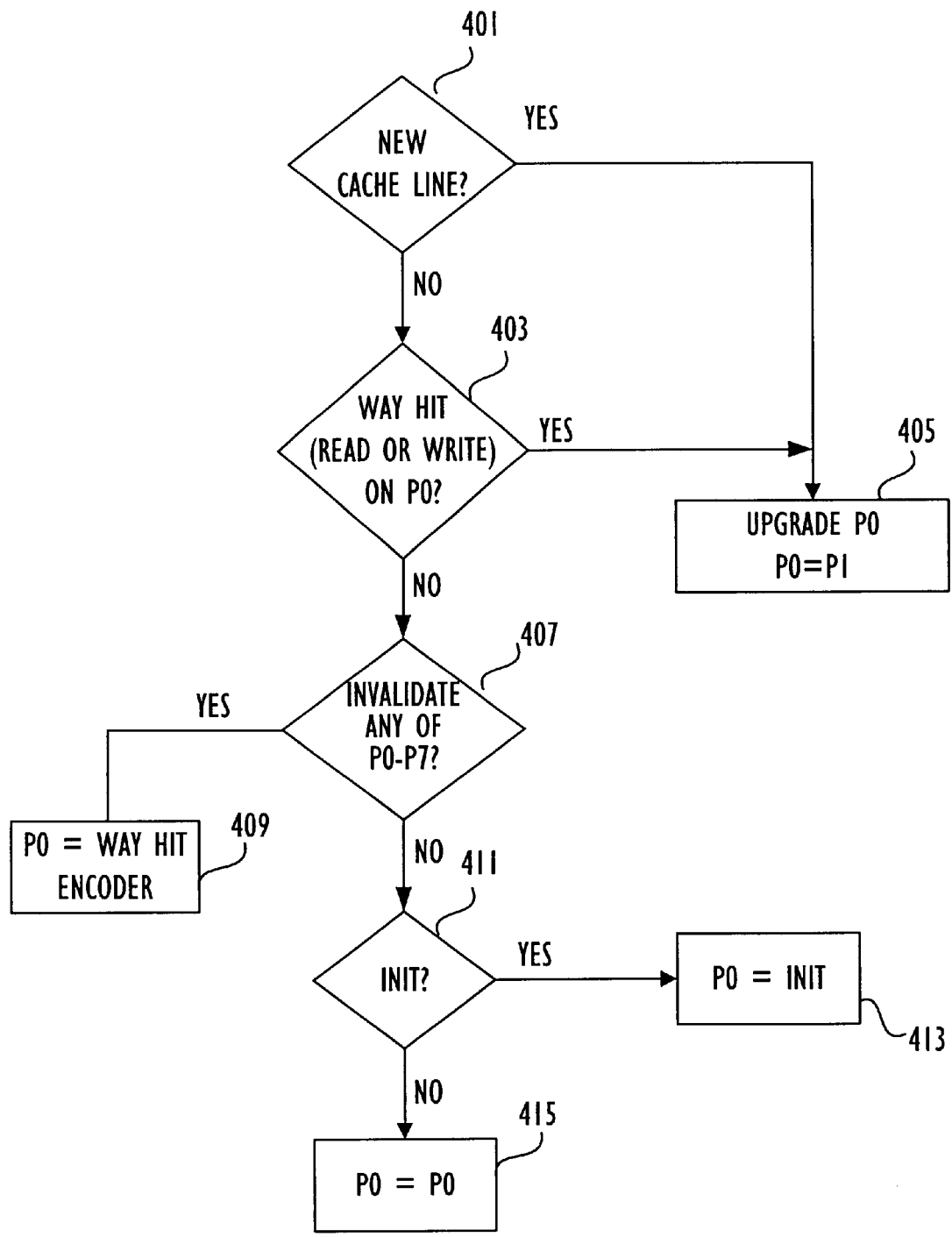
FIG. 4 provides a flow chart illustrating operation of the control logic for the LRU pointer according to one embodiment of the present invention.

Referring to FIG. 4, the flow chart illustrates the operation of the multiplexer control logic for the LRU pointer. If the access operation to the cache line set is an operation in which a new cache line is going to be stored in the set (401)

or if there is a hit on the way pointed to by P0 (403), then P0 is promoted in 405. P0 is promoted by storing a new pointer value, specifically the P1 register 312 value as the new P0 pointer value. Note that the LRU pointer P0 is only affected by a hit (read or write) on a valid cache line if the hit is on the LRU cache line itself. Otherwise, the LRU pointer is not affected by cache line hits (see, e.g., FIG. 1C). The control logic checks in 407 if the access operation is an operation in which a valid cache line in the set is invalidated. If so, then the P0 pointer register 311 receives the encoded way hit value 331 in 409. In that way, the LRU pointer is made to point to the most recently invalidated cache line.

If 407 is not true, then the control logic checks for an initialization condition in 411. If the initialization condition is true then the control logic selects the INIT input to multiplexer 301 and the P0 register is initialized to '000' in 413 to point to way0. Otherwise in 415, multiplexer 301 selects the output from the P0 register 311. That is, P0 keeps its value.

Figure 5:
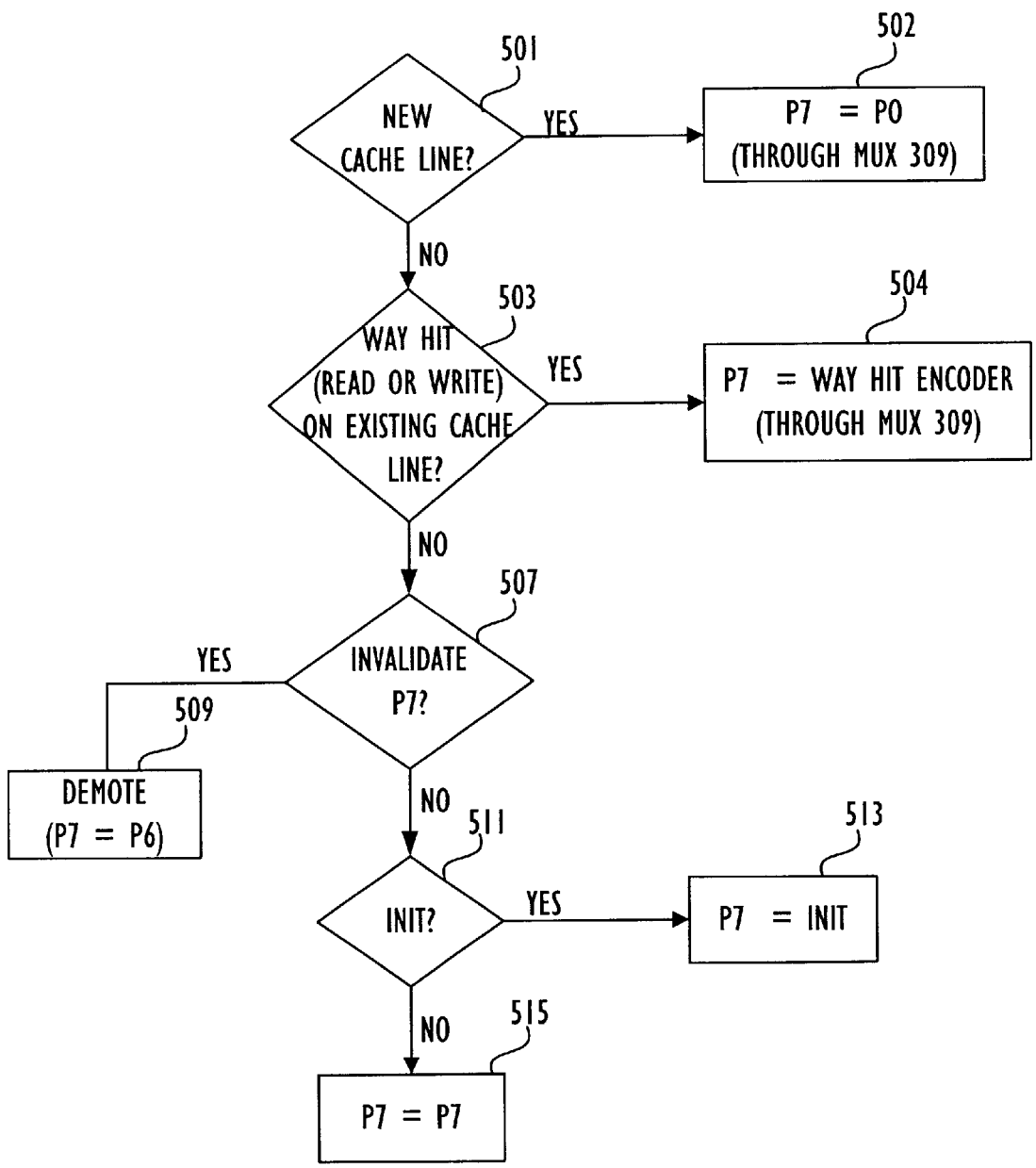
FIG. 5 provides a flow chart illustrating operation of the control logic for the most recently used (MRU) pointer according to one embodiment of the present invention.

Referring to FIG. 5, the flow chart illustrates the operation of the multiplexer control logic for the MRU pointer. Note in FIG. 3 that there are two multiplexers for the MRU pointer, multiplexers 308 and 309. Multiplexer 309 selects either the encoded way hit value 331 or the output of the P0 register. The control of both multiplexers is now described.

If a new cache line is to be written into one of the ways of the set in 501 or if there is a hit in one of the existing valid cache lines in the set in 503, e.g., a read or write access to a valid cache line, then multiplexer 309 is selected as the input to multiplexer 308. More specifically, if there is a new cache line fill in 501, then the P7 register 318 takes on the value of P0 through multiplexer 309 in 502. That is because the P0 register points to the LRU cache line which is either evicted to accommodate a new cache line because it is the oldest or is already invalid. Thus, new cache lines are always written to the way pointed to by P0. If the access is a hit on an existing cache line 503, then P7 takes the value 331 from way hit encoder 330 in 504. If neither 501 or 503 are true then control logic checks in 507 whether or not there was an invalidate (e.g. because of a probe) to the way pointed to by P7. If so, then P7 is demoted in 509 and thus receives the P6 value. If 507 is not true, then the control logic checks for an initialization condition in 511. If the initialization condition is true then the INIT input to multiplexer 308 is chosen and the P7 register is initialized to point to way7 ('111') in 513. Otherwise in 515, multiplexer 308 selects the output from the P7 register 318. That is, P7 keeps its value.

Figure 6:
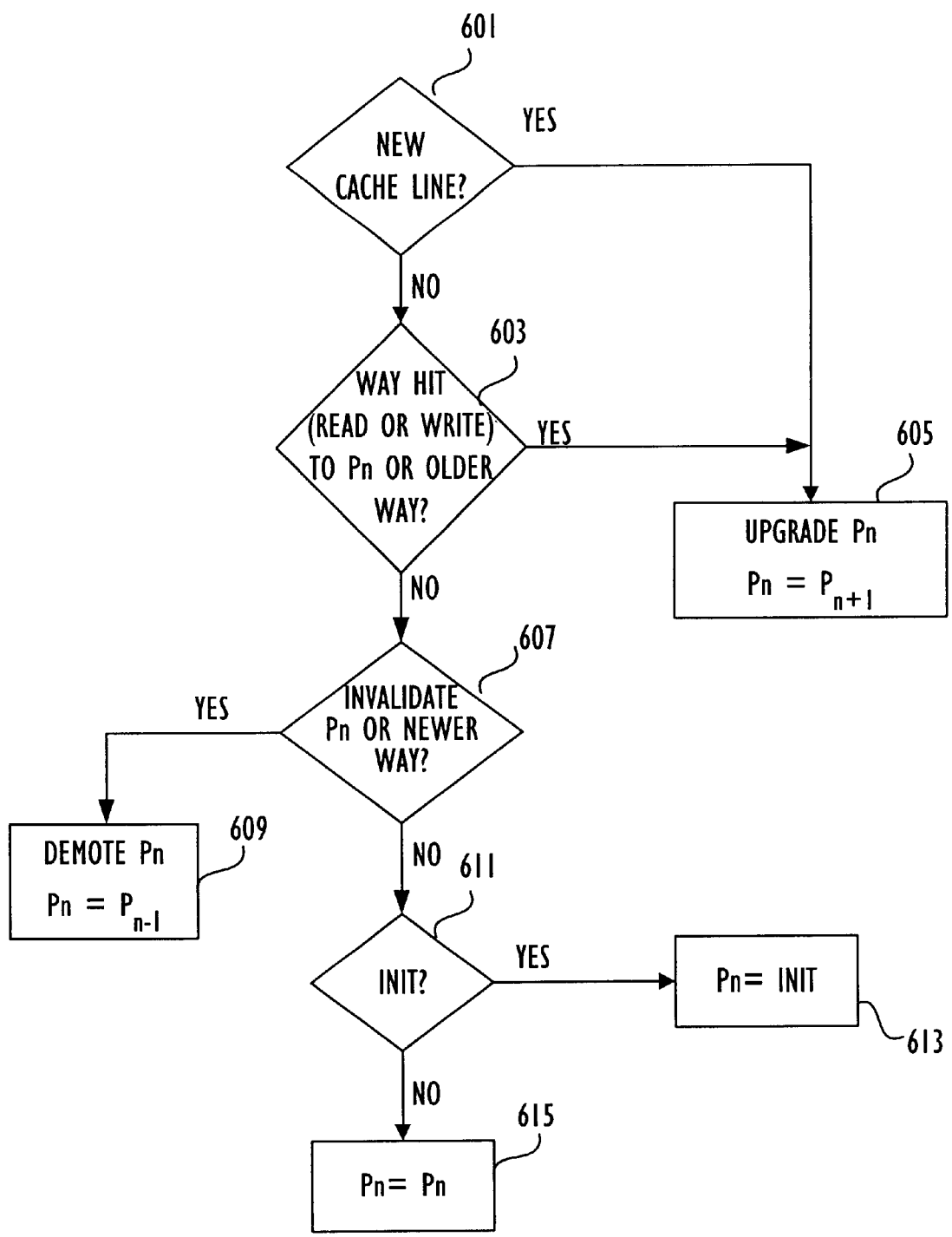
FIG. 6 provides a flow chart illustrating operation of the control logic for one of the intermediate pointers according to one embodiment of the present invention.

The control logic for the multiplexer for one of the intermediate pointers (P1–P6) will now be described. The control logic for the other intermediate pointers is substantially the same. Referring to FIGS. 3 and 6, the operation of the control logic for multiplexer 304 will now be described.

Referring to FIG. 6, the flow chart illustrates the operation of the multiplexer control logic for the intermediate pointer Pn where n may be any of the pointers P1 P6. In the general case, Pn may be any of the pointers that are not the LRU or MRU pointer. If the access operation to the cache line set is an operation in which a new cache line is going to be stored in the set (601) or if there is a hit on the way pointed to by Pn or an older way pointer (P0–P(n−1)) (603), then Pn is promoted in 605 to receive the pointer value of its nearest newer neighbor. Pn is promoted by storing a new pointer value, specifically the P(n+1) pointer value as the new Pn pointer value. Note that the Pn pointer is not affected by a hit to a cache line that is newer than its own cache line. Thus, Pn is not affected by hits to ways pointed by P(n+1)–P7.

If 603 is false, then in 607 the control logic determines if a hit is occurring that is invalidating Pn or any newer pointers (P(n+1)–P7). If so, then Pn is demoted in 609 by taking on the value of its nearest older neighbor. In that case Pn takes on the value of P(n−1). Pn is only affected by an operation invalidating a cache line that is invalidating a cache line that is itself or newer.

If 607 is false, then the control logic checks for an initialization condition in 611. If the initialization condition is true (all ways are invalid) then the control logic selects the INIT input to multiplexer 301 and the Pn pointer register is initialized to 'n' in 613 to point to wayn. Otherwise in 615, the multiplexer selects the output from the Pn register. That is, Pn keeps its value.

The description of the invention set forth herein is illustrative, and is not intended to limit the scope of the invention as set forth in the following claims. For instance, the direction of shift and other control determinations are affected by the configuration of the pointer registers. The control logic descriptions have assumed the pointer configuration shown in FIG. 2A. It would be readily apparent to one of skill in the art to adjust the control logic to match the configurations shown in FIGS. 2B or 2C. Other variations and modifications of the embodiments disclosed herein, may be made based on the description set forth herein, without departing from the scope and spirit of the invention as set forth in the following claims.

What is claimed is:

1. A method for implementing a least recently used (LRU) cache replacement algorithm for a cache memory, comprising:

maintaining a set of N pointer registers pointing to respective ways of an N-way set of memory blocks, one of the pointer registers being an LRU pointer, pointing to a least recently used way and another of the pointer registers being a most recently used (MRU) pointer, pointing to a most recently used way;

for a cache fill operation in which a new memory block is written to one of the N ways,
      writing the new memory block into a way (way$_n$), pointed to by the LRU pointer;
      promoting all pointers except the MRU pointer to point to a way pointed to by respective newer neighboring pointers, the newer neighboring pointers being neighbors towards the MRU pointer; and
   pointing the MRU pointer to way$_n$;
   for an invalidate operation in which one of the ways, way$_k$ is invalidated,
      demoting all pointers from the pointer pointing to way$_k$ and older but not the LRU pointer; and
      pointing the LRU pointer to the invalidated way.

2. The method as recited in claim 1 further comprising:
   for a cache hit in which one of the memory blocks in the set, way$_m$, is accessed for a write or read operation,
   promoting the pointers way$_m$ and newer, except for the MRU pointer, to point to a way pointed to by a newer nearest neighboring pointer; and pointing the MRU pointer to way$_m$.

3. The method as recited in claim 1 further comprising:
   comparing each pointer to a current way hit value indicating a way being affected by a current operation, and providing pointer hit information specifying if a way pointed to by each pointer is being affected by the current operation.

4. The method as recited in claim 3 further comprising:
   generating the current way hit value in a way hit encoder; and supplying the current way hit value to equality comparators that provide the pointer hit information.

5. The method as recited in claim 3 further comprising determining if more than one way pointer is being affected by a current operation, thereby indicating an error condition.

6. The method as recited in claim 3 further comprising using the pointer hit information to select next values for the pointers.

7. The method as recited in 3 further comprising selecting a next value in an MRU selector circuit for the MRU pointer from one of an older neighboring pointer, an MRU pointer initial value, the current way hit value and a value of the LRU pointer, according to a type of operation being performed on the set.

8. The method as recited in claim 7 further comprising selecting a current pointer value as a next pointer value when a pointer is not affected by a current operation.

9. The method as recited in 3 further comprising selecting a next value in an LRU selector circuit for the LRU pointer from one of a newer neighboring pointer, an LRU pointer initial value and the current way hit value, according to a type operation being performed on the set.

10. The method as recited in 3 further comprising selecting a next value in an intermediate pointer selector circuit from one of a next newer neighbor, a next older neighbor and an initialization value, the intermediate pointer being one of the pointers newer than the LRU pointer and older than the MRU pointer.

11. The method as recited in claim 1 wherein each pointer, on initialization, points to a predetermined way.

12. An integrated circuit including a least recently used (LRU) cache replacement circuit, for one set of N cache lines in an N-way set associative cache, comprising:

N registers, each register being a way pointer and containing a way pointer value pointing to a respective one of the N cache lines, a predetermined one of the N registers being an LRU way pointer, pointing to a least recently used way, another predetermined one of the N registers being an MRU pointer pointing to a most recently used way in the set and remaining registers being intermediate way pointers pointing to intermediate ways, each of the intermediate pointers pointing to successively more recently used ways, when all the ways are valid, as the intermediate pointers go from the LRU pointer towards the MRU pointer;

a plurality of selector circuits coupled to provide a next pointer value for each of the registers, wherein each selector circuit for the intermediate way pointers selects one of a newer neighbor, an older neighbor and an initial value as the next intermediate pointer value, wherein an MRU selector circuit for the MRU pointer selects one of an older neighbor, an initial value for the MRU pointer, a current way hit value and a value of the LRU pointer, as a next MRU pointer value; and wherein an LRU selector circuit for the LRU pointer selects one of a newer neighbor, an initial value, and the current way hit for a current operation, as a next LRU pointer value.

13. The integrated circuit as recited in claim 12 wherein respective selector circuits for the intermediate pointers further select as respective next intermediate pointer values, respective current values of the respective intermediate pointers.

14. The integrated circuit as recited in claim 12 wherein the LRU selector circuit further selects as the next LRU pointer value a current value of the LRU pointer.

15. The integrated circuit as recited in claim 12 wherein the MRU selector circuit further selects as the next MRU pointer value a current value of the MRU pointer.

16. The integrated circuit as recited in claim 12 wherein for a cache hit in which one of the cache lines, $way_n$, in the set is accessed for a write or read operation, the MRU selector circuit selects $way_n$ as a next MRU pointer value and wherein each selector circuit for respective pointers pointing to $way_n$ and newer ways, except for the MRU pointer, selects a pointer value from a newer nearest neighbor as a next pointer value to promote those pointers pointing to $way_n$ and newer except for the MRU pointer.

17. The integrated circuit as recited in claim 12 wherein for a cache operation invalidating one of the ways in the set, $way_i$, the LRU selector circuit selects as a next LRU pointer value, a current way hit indicating the invalidated way, $way_i$, and wherein the selector circuits for pointers pointing to the invalidated way, $way_i$, and older, except for the LRU selector circuit, select as a next pointer value for their respective pointers a value of an older neighbor to demote those pointers pointing to the invalidated way and older, except for the LRU pointer.

18. The integrated circuit as recited in claim 12 wherein when a new cache line is written into the set of cache lines, the MRU selector circuit selects the way, $way_n$, pointed to by the LRU pointer, as a next MRU pointer value and wherein each selector circuit for respective remaining pointers select a newer neighbor as a respective next pointer value to promote respective remaining pointers.

19. The integrated circuit as recited in claim 12 further comprising N comparators for determining whether a way hit for a current operation matches a way pointed to by the respective pointers.

20. The integrated circuit as recited in claim 19 further comprising an encoder coupled to supply to the respective comparators the way hit for a current operation.

21. The integrated circuit as recited in claim 19 further comprising an error circuit coupled to the comparators to determine if more than one of the comparators indicates a hit.

22. The integrated circuit as recited in claim 12 wherein the integrated circuit includes a processor.

23. An integrated circuit comprising:

a set of N pointer registers pointing to respective ways of an N-way set of cache lines, one of the pointer registers being an LRU pointer, pointing to a least recently used way and another of the pointer registers being a most recently used (MRU) pointer, pointing to a most recently used way;

for a cache hit in which one of the ways in the set, $way_m$, is accessed for a write or read operation, means for promoting the pointers $way_m$, and newer, except for the MRU pointer;

means for pointing the MRU pointer to $way_m$;

for an invalidate operation in which one of the ways, $way_k$, is invalidated, means for demoting all pointers from the pointer pointing to $way_k$ and older but not the LRU pointer; and means for pointing the LRU pointer to the invalidated way.

24. The integrated circuit as recited in claim 23 further comprising, for a cache fill operation in which a new memory block is written to one of the N ways:

means for pointing the MRU pointer to a way pointed to by the LRU pointer; and means for promoting all pointers except the MRU pointer to point to a way pointed to by a respective newer neighboring pointer.

25. A method for implementing a least recently used (LRU) cache replacement algorithm for a cache memory, comprising:

maintaining a set of N pointer registers pointing to respective ways of an N-way set of memory blocks, one of the pointer registers being an LRU pointer, pointing to a least recently used way and another of the pointer registers being a most recently used (MRU) pointer, pointing to a most recently used way;

for an invalidate operation in which one of the ways, $way_k$ is invalidated, demoting all pointers from the pointer pointing to $way_k$ and older but not the LRU pointer; and pointing the LRU pointer to the invalidated way.

26. An integrated circuit comprising:

a set of N pointer registers pointing to respective ways of an N-way set of cache lines, one of the pointer registers being an LRU pointer, pointing to a least recently used way and another of the pointer registers being a most recently used (MRU) pointer, pointing to a most recently used way;

for an invalidate operation in which one of the ways, $way_k$, is invalidated, means for demoting all pointers from the pointer pointing to $way_k$ and older but not the LRU pointer; and means for pointing the LRU pointer to the invalidated way.

* * * * *